H. Z. COBB.
HOSE AND THE PROCESS OF MAKING THE SAME.
APPLICATION FILED FEB. 4, 1915.
1,230,867.
Patented June 26, 1917.
2 SHEETS—SHEET 1.
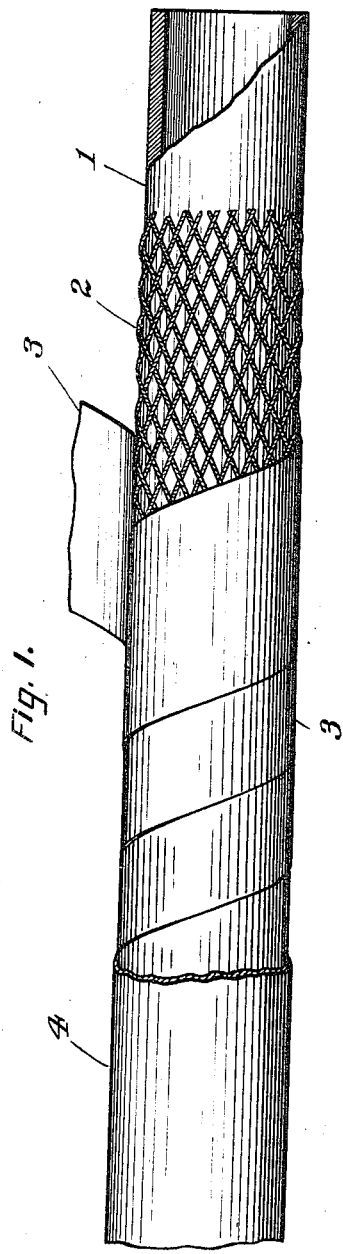
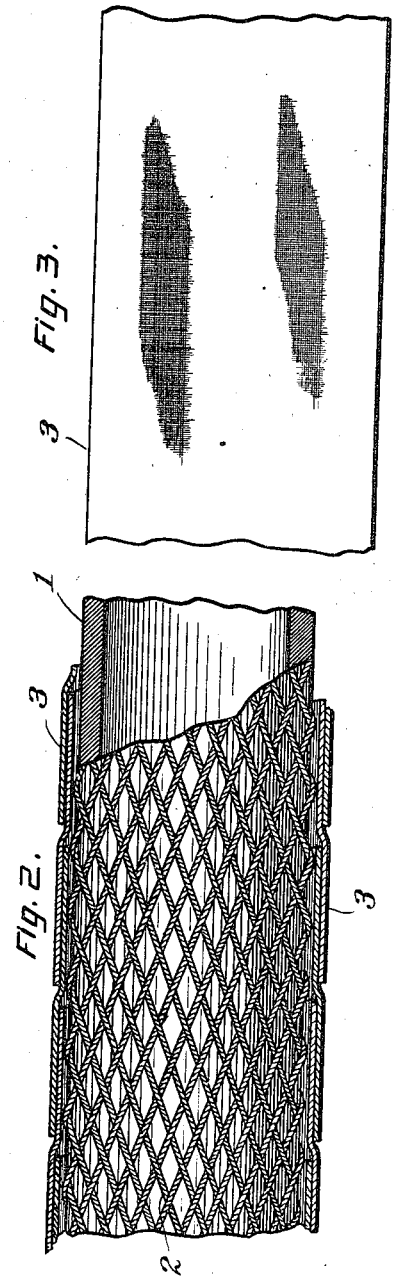
Witnesses:
Inventor:
Henry Z. Cobb.
by Ernest Hopkinson
his Attorney

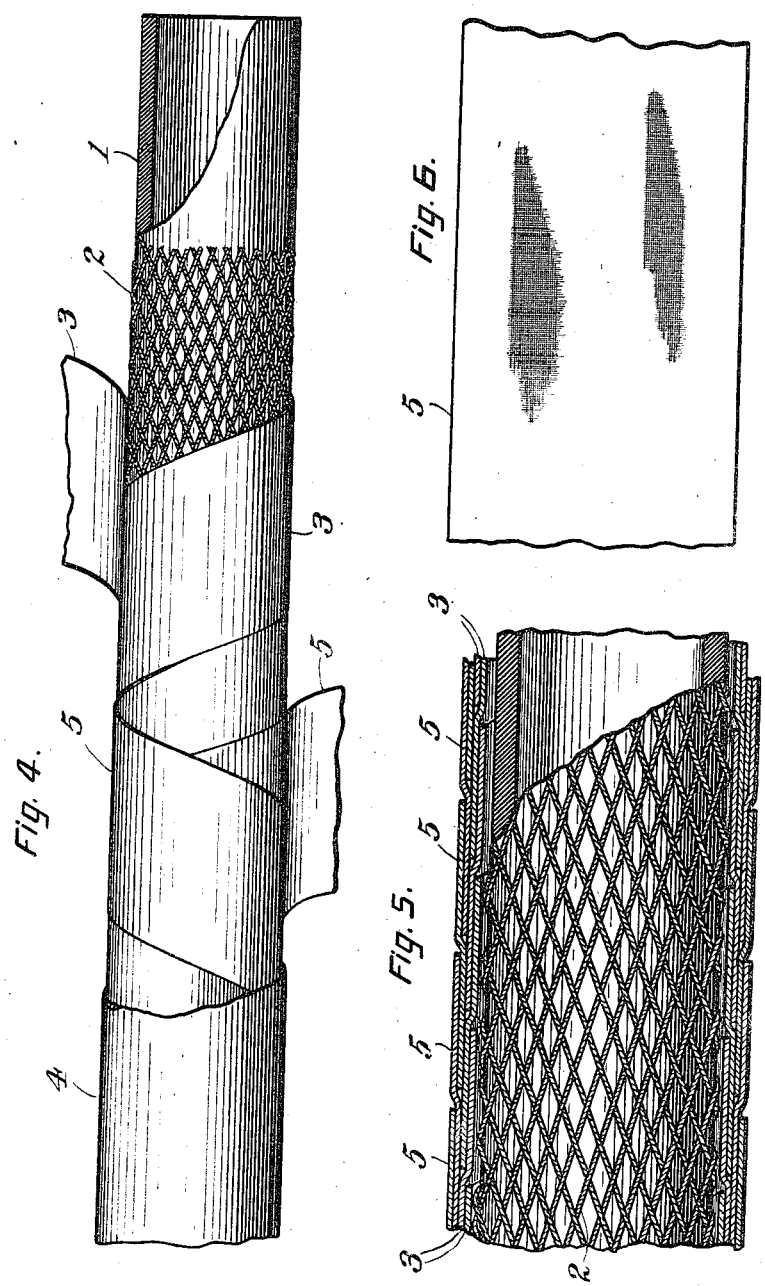

UNITED STATES PATENT OFFICE.

HENRY Z. COBB, OF WINCHESTER, MASSACHUSETTS, ASSIGNOR TO REVERE RUBBER COMPANY, A CORPORATION OF RHODE ISLAND.

HOSE AND THE PROCESS OF MAKING THE SAME.

1,230,867.

Specification of Letters Patent.   Patented June 26, 1917.

Application filed February 4, 1915.   Serial No. 6,021.

*To all whom it may concern:*

Be it known that I, HENRY Z. COBB, a citizen of the United States, residing at Winchester, county of Middlesex, State of Massachusetts, have invented certain new and useful Improvements in Hose and the Process of Making the Same, of which the following is a full, clear, and exact description.

My invention relates to hose composed of rubber and fabric, particularly to what is known in the art as "wrapped" hose, in which a tubular inner portion of rubber is usually covered with a spiral wrapping of fabric.

Broadly, my invention comprises the manufacture of hose in which the fabric is applied in the form of a spiral winding or ribbon of the fabric cut longitudinally in the direction of the warp strands or threads.

Heretofore in the manufacture of wrapped hose it has usually been the custom to form the inner rubber tube on a suitable mandrel or "pole" and then to cover the same with the spiral wrapping of fabric which has been usually cut on the bias to give the necessary flexibility and durability to the hose. This wrapping operation was necessarily accomplished by hand, the fabric being placed on a table of the desired length of the hose, say fifty feet, and the mandrel with the rubber tube thereon rolled over the fabric so that the same was wrapped about the entire length of the mandrel a requisite number of times to give the necessary plies.

In accordance with the present invention, the hose may be made in continuous lengths of five hundred feet, or even more, and may be wrapped very rapidly in a machine provided for that purpose. Such a machine is described and claimed in my co-pending application Serial No. 6,022, filed February 4, 1915, which has matured into Patent No. 1,204,342, issued Nov. 7, 1916 and includes a device for smoothly wrapping the successive helical turns of fabric about the hose as it is fed through the machine. Owing to the fact that the strips of frictioned fabric are wrapped helically about the hose, the threads of the fabric are thereby caused to pass helically about the hose as concerns both the warp and the weft threads. This produces the same advantages as cutting the fabric on the bias and then wrapping the hose with one continuous longitudinal strip.

I have also found that my improved hose is capable of withstanding an internal pressure nearly twice that of hose wrapped in the ordinary manner, without bursting. My improved hose is also much cheaper to manufacture owing to the fact that the fabric can be wrapped much more rapidly than by the old process where the hose is wrapped by hand. I believe that I am the first to produce a wrapped hose in which the manufacture may be carried on for continuous lengths over fifty feet, and in the present instance the quantity that can be manufactured in one continuous length is limited only by the facilities for handling and vulcanizing the hose.

For a detailed description of two forms of my invention and the process of making the same, reference may be had to the following specification and to the accompanying drawings forming a part thereof, in which:

Figure 1 is an illustration of a piece of hose made in accordance with this invention, and having parts thereof cut away so as to indicate the interior construction;

Fig. 2 is a similar view of a piece of the hose showing the rubber removed therefrom, and the fabric in section;

Fig. 3 indicates a short section of the wrapping strip;

Fig. 4 indicates a piece of hose in which the wrapping is placed thereon in two helical layers, and also showing portions thereof cut away;

Fig. 5 illustrates a short section of the hose shown in Fig. 4, the outer wrappings being shown in section; and Fig. 6 indicates a piece of the wrapping similar to that of Fig. 3.

Referring to the drawings, the numeral 1 indicates a tube of vulcanizable rubber composition which may be made in any suitable way, such as by the pressure or well known way, such as by the pressure or drawing method in which the rubber is forced through the annular space between two dies. After the tube has been formed, the same is then preferably run through a suitable braiding machine in which a braided covering of helically inclined strands are placed on the outer surface of the tube. These strands are preferably coated with rubber composition at the braiding point, or while the covering is being formed. This covering 2 is preferably braided while the interior tube 1 is under a certain degree of atmospheric or other fluid pressure to prevent the same from collapsing.

The tubing with the covering 2 is then run through a machine similar to that described in my above mentioned application, in which the frictioned fabric 3 is wound spirally about the same for the entire length of the tube without the necessity of stopping at the end of any particular length. Thereafter a layer of vulcanizable rubber composition is applied to the outer fabric 3 in any suitable manner. The hose is then vulcanized for its entire length in any well known and preferred form of mold, or otherwise.

In Fig. 2 it will be noted that the successive convolutions of the fabric overlap each other for about one-half of the width of the same, thus making a two-ply thickness of the fabric on the surface of the rubber tube. It is obvious that the braided covering 2 may be omitted, if desired, but I prefer to use the same as it aids in maintaining the size and shape of the hose during the operation of placing the fabric thereon. It also adds to the durability and strength of the hose.

In Figs. 4 and 5 I have illustrated a form of hose which is similar to that illustrated in Figs. 1 and 2, but has in addition a second layer of helically wound fabric superposed on the first, as indicated at 5. This second layer may be placed in position simultaneously with the first by duplicating the winding mechanism described in my previously mentioned application relating to such a machine. If preferred, however, each layer may be applied separately in two machines or by running the hose through the same machine twice. The strip of fabric 5, as indicated in Fig. 5, may also overlap each successive convolution for substantially one-half of its width, thereby making two additional plies which in addition to the first plies produces a hose of practically four-ply thickness of fabric. Any number of successive windings may thus be laid on, making a hose of the number of plies desired. As above described, the last winding may be covered with a layer of rubber composition 4 to give a smooth appearance and protect the fabric of the outer winding. If it is desired to make a three-ply hose with one winding of the fabric, the successive convolutions of the fabric may be caused to overlap each other for substantially two-thirds of their width, and in a four-ply hose made with a single winding, the successive convolutions may overlap each other for substantially three-quarters of their width, and so on.

Having thus described these forms of my invention, I do not wish to be understood as being limited to the details of form and arrangements of parts herein set forth, for various changes may be made without departing from the spirit and scope of my invention, which, in its broadest aspect comprises the continuous wrapping of hose with frictioned fabric helically wound thereon in long continuous lengths.

What I claim is:

1. An article of manufacture comprising a continuous length of conductive hose having an inner tube of vulcanized rubber compound, and a covering comprising successive convolutions of frictioned fabric under tension, said convolutions overlapping each other successively for half their width, whereby a smooth layer of substantially continuous two-ply fabric is formed.

2. An article of manufacture comprising a continuous length of conductive hose, having an inner tube of vulcanized rubber compound, a covering of braided strands impregnated with rubber composition, and successive convolutions of frictioned fabric under tension, said convolutions overlapping each other for half their width, whereby a smooth layer of substantially continuous two-ply fabric is formed.

3. The process of making a continuous length of a tubular article which comprises forming an inner layer of suitable material, inflating the same and continuously wrapping the same with a series of helical convolutions of frictioned fabric under tension.

4. The process of making continuous lengths of conductive hose which comprises forming an inner tube of rubber composition, inflating the same, and continuously wrapping the same with a series of helical convolutions of frictioned fabric under tension.

5. The process of making continuous lengths of conductive hose which comprises forming an inner tube of rubber composition, inflating the same, forming a covering of braided strands thereon, and then continuously wrapping the same with a series of helical convolutions of frictioned fabric under tension.

6. The process of making continuous lengths of conductive hose which comprises forming an inner tube of rubber composition, inflating the same, forming a covering of braided strands thereon, and then continuously and simultaneously wrapping a plurality of superposed layers of successive helical convolutions of frictioned fabric thereon under tension, some of said helical convolutions comprising helices of opposite pitch.

Signed this 19th day of Jan. 1915.

HENRY Z. COBB.

Witnesses:
 E. L. STICKNEY,
 E. E. JONES.